(12) United States Patent
Janmey (10) Patent No.: US 7,704,632 B2
(45) Date of Patent: *Apr. 27, 2010

(54) ELECTROCHEMICAL CELL HAVING A VENT ASSEMBLY WITH A RUPTURABLE SEAL MEMBER

(75) Inventor: Robert M. Janmey, Columbia Station, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/411,712

(22) Filed: Mar. 26, 2009

(65) Prior Publication Data

US 2009/0181287 A1 Jul. 16, 2009

Related U.S. Application Data

(63) Continuation of application No. 10/964,039, filed on Oct. 13, 2004, now Pat. No. 7,527,891, which is a continuation-in-part of application No. 10/229,406, filed on Aug. 28, 2002, now abandoned.

(51) Int. Cl.
*H01M 2/12* (2006.01)
(52) U.S. Cl. ............................... 429/56; 429/53; 429/57
(58) Field of Classification Search ............ None
See application file for complete search history.

(56) References Cited

U.S. PATENT DOCUMENTS

| 3,278,340 | A | 10/1966 | Bell |
| 5,422,201 | A | 6/1995 | Georgopolous |
| 6,270,918 | B1 | 8/2001 | Wu |
| 6,270,919 | B1 * | 8/2001 | Janmey ............. 429/56 |
| 6,306,537 | B2 | 10/2001 | Schubert |
| 6,312,850 | B1 | 11/2001 | Janmey |
| 6,620,543 | B2 * | 9/2003 | Li ................... 429/53 |

FOREIGN PATENT DOCUMENTS

| EP | 0966052 A1 | 12/1999 |
| JP | 03089454 A | 4/1991 |
| JP | 7240195 A | 9/1995 |
| WO | 9859383 A1 | 12/1998 |
| WO | WO 98/59383 | * 12/1998 |

* cited by examiner

*Primary Examiner*—Dah-Wei D Yuan
*Assistant Examiner*—Kwang Han
(74) *Attorney, Agent, or Firm*—Russell H. Toye, Jr.

(57) ABSTRACT

An electrochemical cell with a vent assembly that reliably prevents resealing of a vented seal member is provided. The vent assembly seals the end of a container that includes a first electrode, a second electrode, a separator located between the first and second electrodes and an electrolyte in contact with the electrodes and separator. The seal member includes a diaphragm with a hinge along one edge and a vent along another edge. The hinge and vent are located so that, relative to the longitudinal axis of the vent assembly, the hinge is closer to the vent than to the cell's terminal cover.

25 Claims, 5 Drawing Sheets

ELECTROCHEMICAL CELL HAVING A VENT ASSEMBLY WITH A RUPTURABLE SEAL MEMBER

CROSS-REFERENCE TO A RELATED APPLICATIONS

This application is a continuation of U.S. application Ser. No. 10/964,039 filed on Oct. 13, 2004, now U.S. Pat. No. 7,527,891 which is a continuation-in-part of U.S. application Ser. No. 10/229,406, filed on Aug. 28, 2002 now abandoned.

BACKGROUND OF THE INVENTION

This invention generally relates to ventable seals for pressurized containers and, more particularly, to ventable seals for electrochemical cells.

Electrochemical cells, such as cylindrical alkaline electrochemical cells, employ two electrochemically active materials and an aqueous electrolyte. The electrochemically active materials are typically manganese dioxide and zinc. These materials are conventionally housed in a cylindrical elongated container that is open on one end so that the electrochemically active materials and electrolyte can be inserted therein during the cell manufacturing process. A closure assembly that incorporates a disc shaped polymeric seal member, a rigid inner cover and an elongated metallic current collector that projects through the center of the seal member, closes the open end of the container. The seal member usually includes a hub, which surrounds the collector, and a thin diaphragm integrally molded into the central region of the seal body. The function of the diaphragm is to rupture and release gas from within the cell when the internal pressure becomes too high. The collector provides a conductive path between the zinc and one of the cell's terminal covers which is located on an end of the cell.

Manufacturers of electrochemical batteries constantly strive to improve the performance of their products in a wide variety of battery powered devices. A key objective of most battery manufacturers is to improve the amount of time that a battery will power a device. One strategy to accomplish this objective is to minimize the volume occupied by the cell's nonelectrochemically active components, such as the cell's vent assembly, thereby leaving more volume within the cell available for the electrochemically active components. In recent years, vent assemblies have been made more volume efficient by redesigning them to require fewer components and yet operate more reliably than previously known vent assemblies. As the volume occupied by the vent assembly has decreased, the problem of a vented seal "resealing" against another component of the vent assembly has become more apparent. This problem can occur in primary batteries, also known as nonrechargeable batteries, if they are charged by other batteries. While most batteries are used in a conventional manner, a small percentage of batteries are exposed to an abusive condition such as when a primary battery is inadvertently placed in a device such that the battery's positive and negative terminals are reversed. This problem could occur, for example, in some commercially available flashlights that are powered by eight AA size alkaline batteries. Typically, the batteries are inserted into two elongated chambers containing four batteries each. According to the instructions that accompany the flashlight, the batteries must be inserted "in series," which means that the positive terminal of one battery contacts the negative terminal of an adjoining battery. Unfortunately, some consumers fail to comply with the instructions that are normally included with the device and accidentally insert one of the cells backwards. If this occurs with the second or third battery in a cavity containing four batteries, then the cell inserted backwards will be charged by one or more of the properly inserted cells when the light's switch is moved to the "on" position. Charging the battery that has been inserted backwards generates significant quantities of heat and gas within the battery. In some situations, the external temperature of the battery could exceed 65° C. The increase in temperature increases the pressure within the cell. In addition to increasing the temperature of the battery, the chemical reactions that take place during the charging of the cell generate gas that substantially increases pressure within the cell. The simultaneous production of gas and increase in temperature causes the polymeric seal, which is typically made of nylon, to become soft and lose some of its structural rigidity. The thin ventable portion of the seal may become elongated due to both the heating of the nylon and the increase in internal pressure. Consequently, when the softened and distorted seal ruptures in response to the pressure buildup, an initial quantity of gas may escape from within the cell but the tear in the ruptured seal may be resealed when the softened ruptured seal contacts the smooth inner surface of the terminal cover and reseals against the terminal cover. This problem is particularly acute with low volume vent assemblies wherein the distance between the seal member and other components, such as the cell's cover, is very small. If the ruptured seal does reseal against the cover and the cell continues to generate gas, the cell may eventually experience a crimp release wherein the crimped connection between the seal and container is broken and the vent assembly is forcefully ejected from the container.

As disclosed in U.S. Pat. No. 6,270,919 B1, previous attempts to prevent resealing of a ruptured seal body have included modifying a seal's inner disc portion to include ribs. The ribs are designed to maintain the opening in a ruptured seal body thereby preventing resealing of the vent mechanism. However, while the inclusion of ribs in the seal's diaphragm is helpful in preventing resealing in most cells, some seals with the ribs incorporated therein may be deformed when exposed to the heat generated during charging such that the ribs cannot maintain the opening in the seal after it has ruptured.

In a seal embodiment disclosed in U.S. Pat. No. 6,312,850 B1, vertical grooves were placed in the surface of a compression member that forms a part of the seal assembly. The grooves are designed to prevent resealing of a vented seal's diaphragm. The grooves create channels that allow the gas to vent and thereby prevent resealing of the vented diaphragm. While this embodiment does prevent resealing of the diaphragm against the surface of the hub, the grooves in the compression member cannot prevent resealing of the torn diaphragm against the interior surface of the cell's terminal cover.

U.S. Pat. No. 6,270,918 B1 discloses a seal assembly that utilizes a seal member and an inner cover with openings incorporated therein. The seal member directly abuts the inner cover. An outer cover is secured to the seal assembly and forms a contact terminal of the cell. If the cell's pressure increases beyond an acceptable limit, the seal member ruptures thereby allowing gas to escape through the openings in both the inner cover and contact terminal. While the described seal assembly does safely vent an electrochemical cell, the seal assembly relies upon the use of the inner cover. Unfortunately, the inner cover occupies space within the cell that could be better used to store more of the cell's electrochemically active materials.

Therefore, there exists a need for an inexpensive and simple to manufacture polymeric vent assembly that occupies a minimum amount of volume within the cell and can reliably prevent resealing of a vented seal against the electrochemical cell's terminal cover.

BRIEF SUMMARY OF THE INVENTION

The present invention provides an electrochemical cell with a vent assembly that reliably prevents resealing of a vented seal member. The vent assembly occupies a minimum amount of space within the cell and is inexpensive to produce.

In one embodiment, the electrochemical cell of the present invention includes an open ended container that includes a first electrode in contact with the container, a separator in contact with the first electrode, a second electrode in contact with the separator and electrolyte in contact with the electrodes and separator. A vent assembly is secured to the open end of the container. The vent assembly has a longitudinal axis and includes a terminal cover, a seal member and a current collector. The terminal cover, which is electrically conductive, has a recessed central region and a rolled back edge that is approximately perpendicular to the central region. The seal member is a rupturable disc shaped component made of a polymeric material. The seal member includes an upstanding perimeter wall compressed between the container and the cover's rolled back edge, and a terminal cover reception channel located adjacent the upstanding perimeter wall. The rolled back edge is disposed within the cover reception channel. The seal member further includes a thin rupturable diaphragm region that has a first edge and a second edge and is located between the seal member's upstanding perimeter wall and a centrally located hub. The hub defines an opening through the seal member. The seal member also includes a hinge which is located adjacent the first edge of the diaphragm region and a vent which is located adjacent the second edge of the diaphragm region. The hinge's elevation, relative to the longitudinal axis of the vent assembly, is closer to the elevation of the vent than to the elevation of the cover's central region. The vent assembly further includes a vent deflection zone which is defined as the space below the cover, above the diaphragm region and between the diaphragm's first edge and second edge. The zone is devoid of any structural element. In response to an undesirable increase in the cell's internal pressure, the seal ruptures along at least a portion of the tine diaphragm's second edge thereby creating a vent flap and an orifice through which pressurized gas in the cell can escape. The flap rotates about the hinge and through the vent deflection zone without contacting any object that would cause the flap to block the release of the pressurized gas. An electrically conductive current collector contacts the hub that extends through the opening in the seal member and contacts the cell's second electrode.

DETAILED DESCRIPTION OF THE INVENTION

Figure 3:
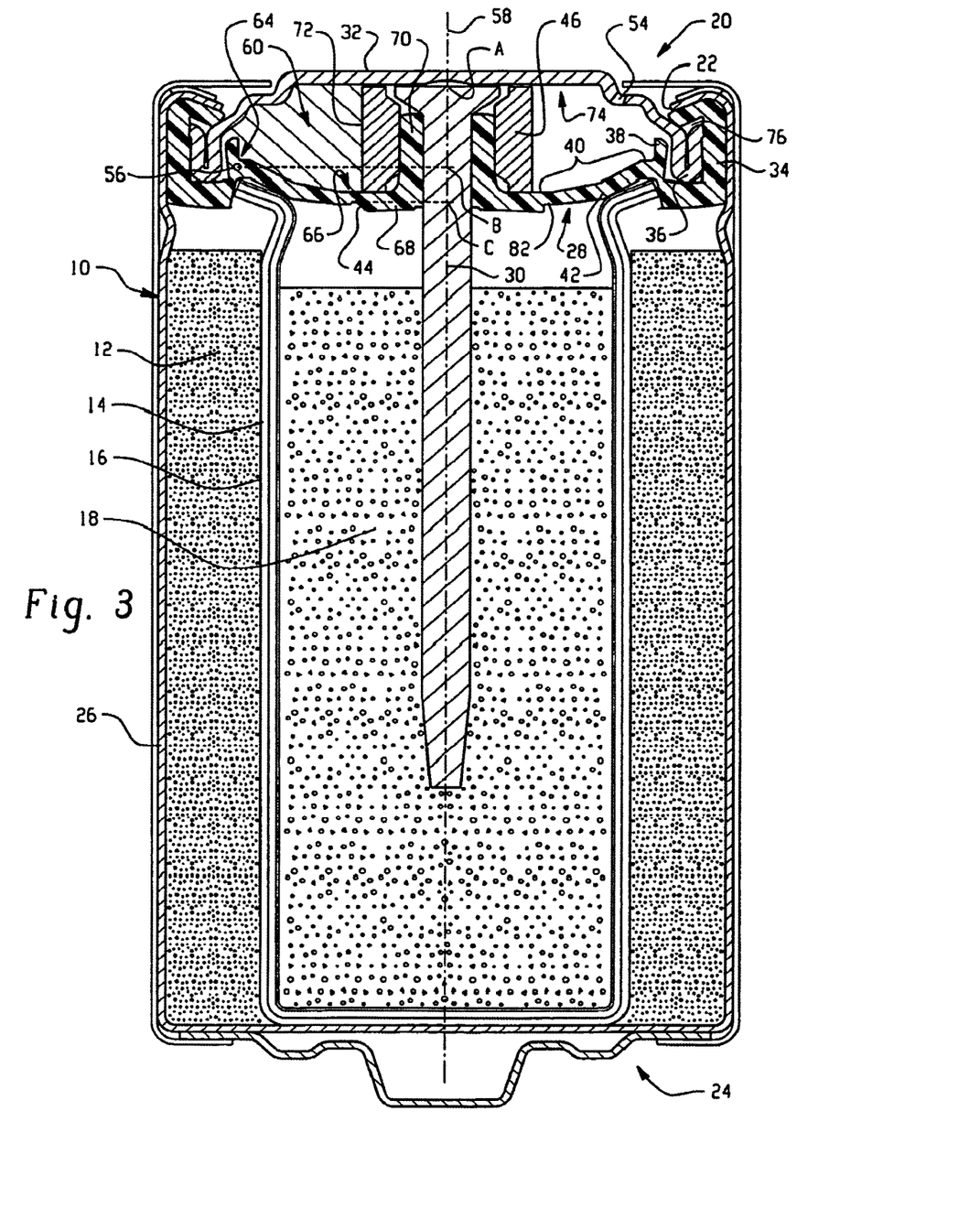
FIG. 3 is a longitudinal cross-sectional view of an electrochemical cell of this invention including the seal member shown in FIG. 1.

Referring now to the drawings and more particularly to FIG. 3, there is shown a cross-sectional view of an assembled electrochemical cell of this invention. Beginning with the exterior of the cell, the cell components are the container 10, first electrode 12 positioned adjacent the interior surface of container 10, separator 14 contacting the interior surface 16 of first electrode 12, second electrode 18 disposed within the cavity defined by separator 14 and vent assembly 20 secured to container 10. Container 10 has an open end 22, a closed end 24 and a sidewall 26 therebetween. The closed end 24, sidewall 26 and vent assembly 20 define a cavity in which the cell's electrodes are housed.

Figure 1:
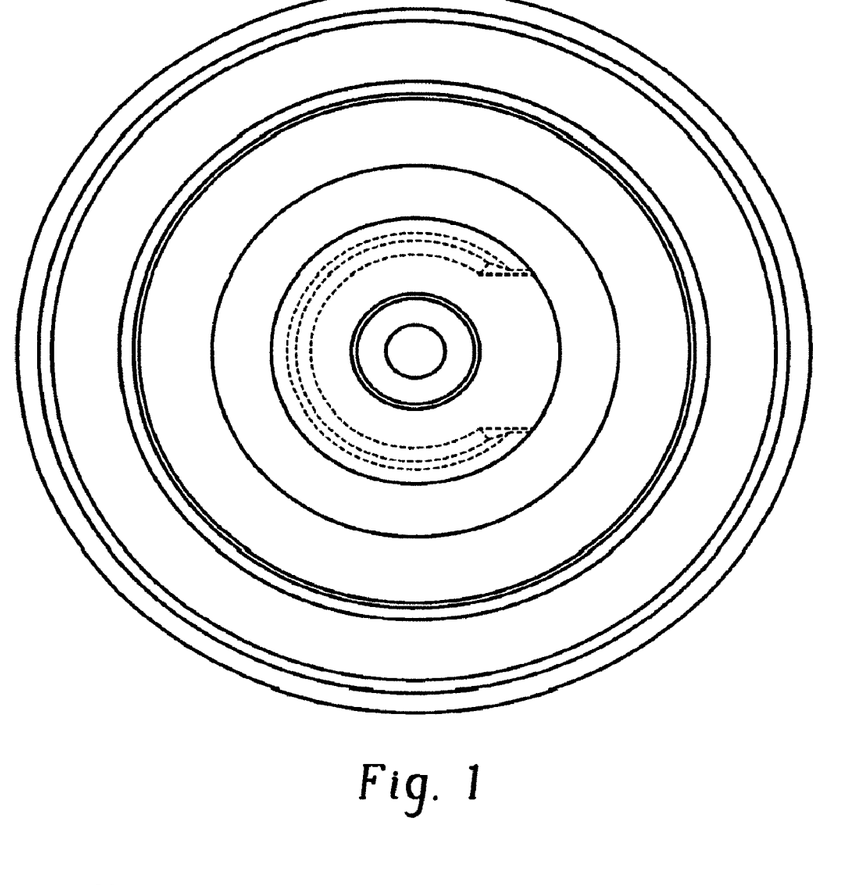
FIG. 1 is a top view of a nonvented seal member useful in a cell of this invention.
Figure 2:
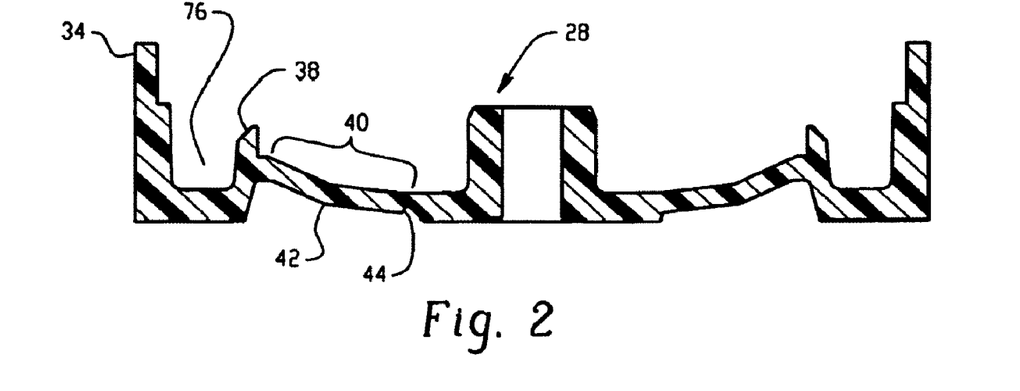
FIG. 2 is a cross-sectional view of a nonvented seal member useful in a cell of this invention.

Shown in FIGS. 1 and 2 is an embodiment of seal member 28 which has several sections that perform a variety of functions. As shown in FIG. 3, the perimeter of seal member 28 is defined by upstanding perimeter wall 34 which forms an electrically insulating barrier between container 10 which serves as the current collector for first electrode 12, and terminal cover 32 which serves as the external contact for second electrode 18. The interior surface of perimeter wall 34, also referred to herein as the upstanding wall, forms one side of a cover reception channel 76 in seal member 28 into which the rollback edge 36 of cover 32 is inserted. Located adjacent the interior surface of rollback edge 36 is buttress wall 38 which extends above the thin rupturable diaphragm region 40. The function of buttress wall 38 is to oppose the force exerted on diaphragm region 40 when the internal generation of gas increases pressure within the cell. In a preferred embodiment, diaphragm region 40 includes an elbow 42 which joins two annular sections of diaphragm 40 at an obtuse angle. By configuring the diaphragm so that it is bowed toward the interior of the cell, the pressure exerted on the diaphragm by the buildup of gas within the cell results in the diaphragm being compressed. When the cell's internal pressure exceeds a predetermined value, the diaphragm inverts and tears at vent line 44 which is a groove in the interior surface of a seal member 28. Vent line 44 is aligned with the outer circumferential surface of compression bushing 46, so that compression bushing 46 facilitates tearing of the diaphragm at vent line 44.

Figure 5:
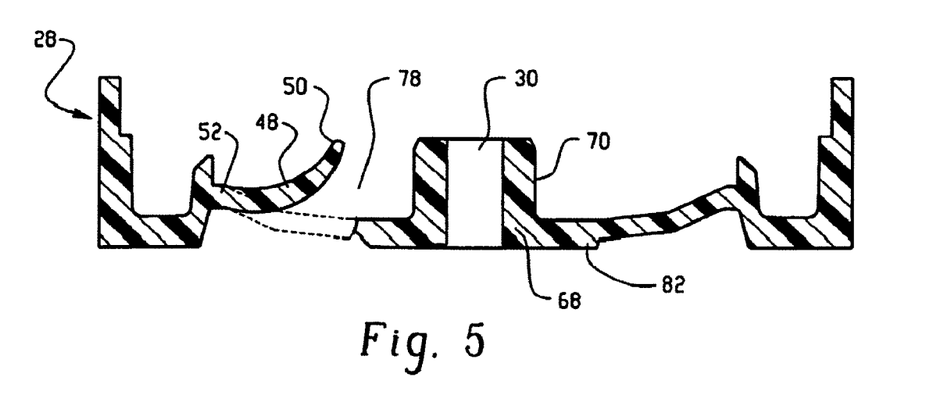
FIG. 5 is a cross-sectional view of a vented seal member useful in a cell of this invention.
Figure 6:
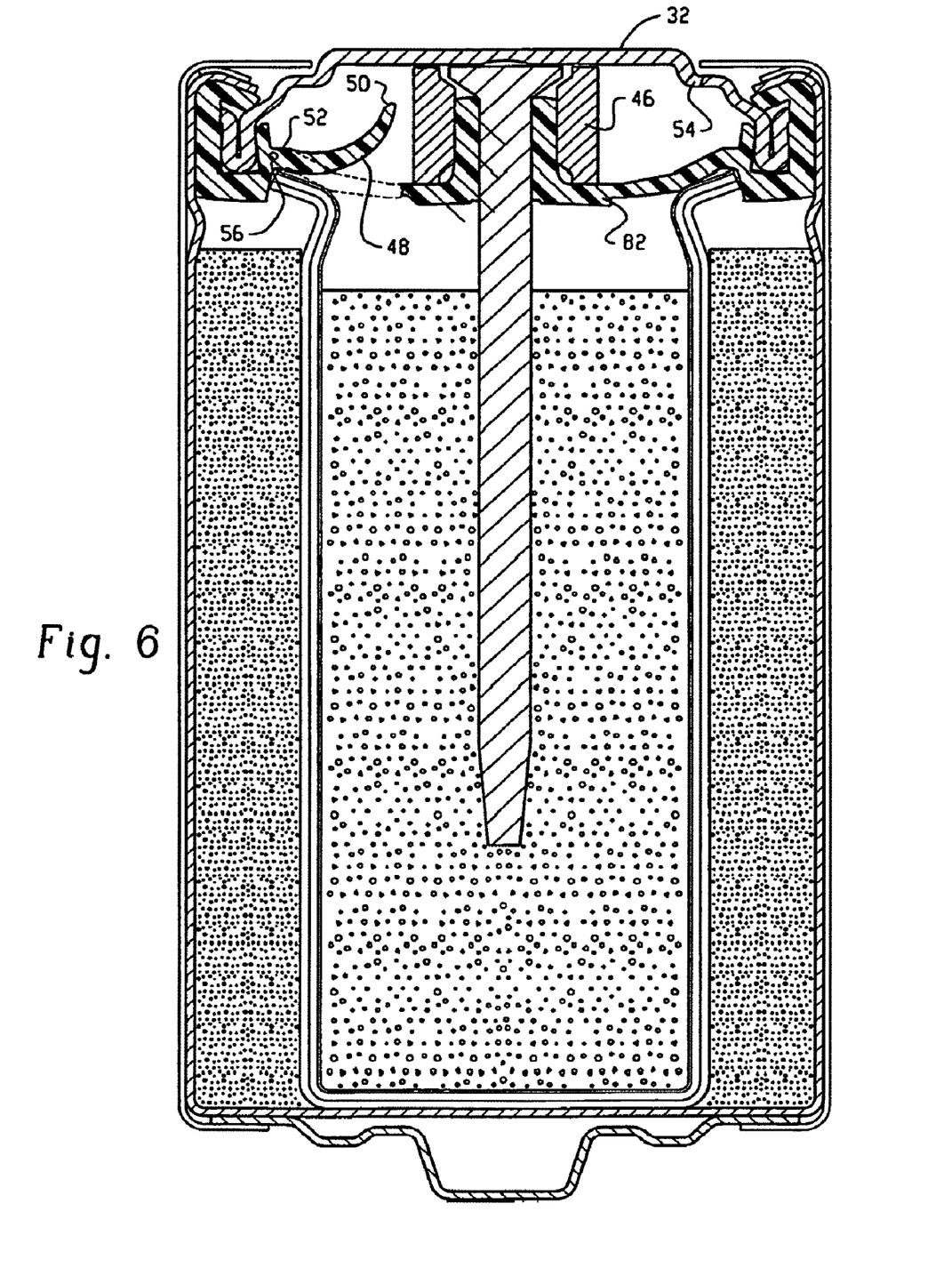
FIG. 6 is a longitudinal cross-sectional view of an electrochemical cell of this invention including the vented seal member shown in FIG. 5.

When diaphragm 40 responds to an undesirable increase in internal pressure by inverting and tearing at vent line 44, diaphragm 40 forms a vent flap 48, see FIGS. 5 and 6, with a distal end 50 and a proximate end 52. Vent flap 48 is specifically designed to rotate toward terminal cover 32 so that orifice 78 is created in seal member 28. Pressurized gas within the cell escapes to the environment beyond the cell by passing through the orifice in the seal member and then through opening 54 in terminal cover 32. Vent flap 48 is made to rotate around hinge area 56, which is located at the proximate end 52 of vent flap 48. In a preferred embodiment, hinge area 56 forms an arc that is concentric with the central opening 30 in seal member 28.

Hinge 56 is the arc shaped line in the seal member about which the vent flap rotates when the seal is ruptured. The hinge coincides with at least a portion of first edge 64 of diaphragm 40. Preferably, the hinge forms an arc or a circle that is concentric with the vent assembly's longitudinal axis.

Abutting and defining another edge of diaphragm 40 is second edge 66. First edge 64 and second edge 66 are concentric with one another and the vent assembly's longitudinal axis.

Figure 4:
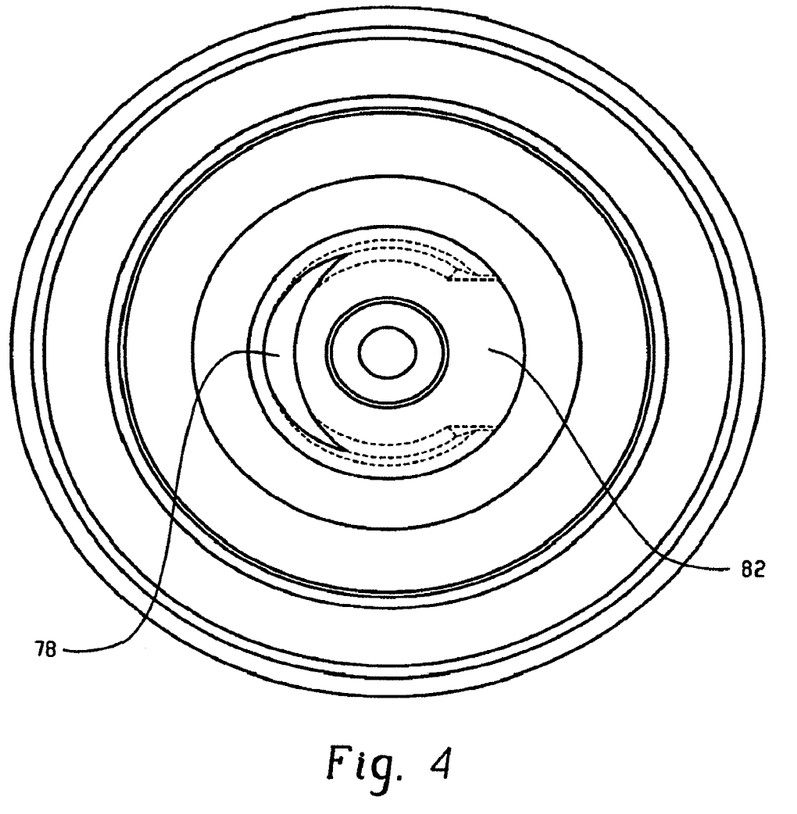
FIG. 4 is a top view of a vented seal member useful in a cell of this invention.

Preferably, second edge 66 comprises a grooved section and a nongrooved section. The grooved section defines the location of vent 44. The nongrooved section forms a nonventable interface between a portion of diaphragm 40 and hub 70. The nonventable interface forms anchor 82. The function of anchor 82 is to secure vent flap 48 to both diaphragm region 40 and hub 70, thereby ensuring that vent flap 48 does not contact terminal cover 32 and form a 360° seal against the interior surface of the terminal cover when the cell's internal pressure causes seal member 28 to rupture at vent line 44. The arc formed by vent line 44 should be at least 180°, more preferably approximately 220° and most preferably not more than 250°. The portion of diaphragm 40 that abuts hub 70 and does not include vent line 44 forms an anchor 82. The arc formed by anchor 82 should be at least 30°, more preferably approximately 100° and most preferably less than 180°. Upon activation of the vent, orifice 78 is formed by tearing the diaphragm at vent line 44. Orifice 78 may extend from one end of vent line 44 to the other end of vent line 44 provided orifice 78 does not extend into the nongrooved section of second edge 66. Alternatively, orifice 78 may extend around a portion of vent line 44 as shown in FIG. 4. The size of orifice 78 is not critical provided it is large enough for the gas within the cell to rapidly escape when the cell vents. The arc of anchor 82 and the arc of vent line 44 form a complete circle.

Relative to the elevation of the vent assembly's longitudinal axis 58, the elevations of hinge 56, terminal cover 32 and vent line 44 in seal member 28 are critical to preventing the resealing of vent flap 48 against the interior surface of cover 32. If the distal end 50 of vent flap 48 is allowed to contact cover 32 and the cell continues to generate gas after the diaphragm has ruptured, as would occur when a cell has been inserted backwards in a multicell device and is subsequently charged by the other cells, then the flap is forcefully pressed against cover 32 thereby blocking further release of gas through the seal member and cover. If the internal pressure exceeds the container's ability to remain crimped over the perimeter of the seal member, then the vent assembly may be rapidly expelled from the container. Some of the cell's other components, such as electrolyte and portions of the anode, may also be forcefully thrown from the container.

To prevent resealing of a vented seal member, the elevation of the hinge must be closer to the elevation of the vent than to the elevation of the cover's central portion. The elevations of the hinge, vent and cover are determined relative to the longitudinal axis 58 of vent assembly 20. As shown in FIG. 3, the longitudinal axis 58 of the vent assembly is concentric with the longitudinal axis of container 10. For use in this application, the highest elevation within the vent assembly is the surface of the terminal cover's central portion. Any point along the vent assembly's axis that is between the terminal cover and the end of current collector 30 that contacts second electrode 18 is considered to be lower than the highest elevation. The elevation of any feature in the vent assembly is determined by connecting a straight line from the feature in question to the vent assembly's longitudinal axis provided the axis and straight line meet at a right angle. When comparing the elevation of any two features in the vent assembly, the feature with its straight line closest to the surface of terminal cover 32 is considered to be higher in elevation than the other feature.

Figure 7:
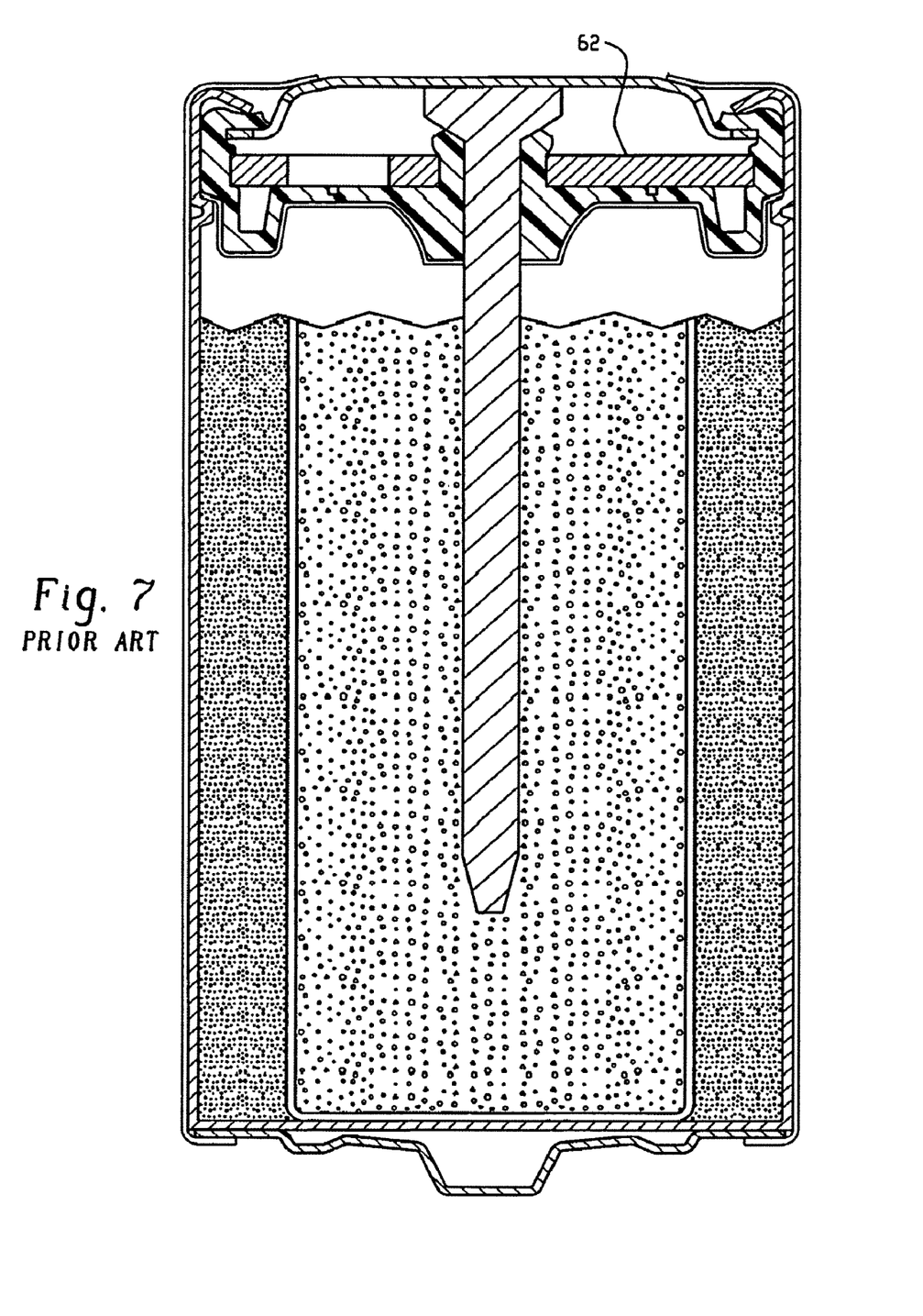
FIG. 7 is an example of an electrochemical cell which is known in the prior art and includes a vent assembly with a support member.

As shown in FIG. 3, the elevations of cover 32, hinge 56 and vent 44, relative to the longitudinal axis of the vent assembly, correspond to points A, B and C, respectively. In the vent assembly of the present invention, the elevation of hinge 56 (point B) must be closer to the elevation of vent 44 (point C) than to the elevation of the junction of collector 30 and the cover's central portion (point A). Preferably, the elevation of hinge 56 is greater than the elevation of vent 44. The physical relationships of the cover, hinge and vent are necessary to ensure that the distal end 50 of vent flap 48 does not contact and reseal against cover 32 when excessive pressure within the cell causes seal member 28 to rupture. During the rupturing of seal member 28, diaphragm 40 rapidly inverts and tears at vent line 44. The portion of the diaphragm located between hinge 56 and vent 44 forms the vent flap 48 which is forced to rotate through the vent deflection zone 60, toward cover 32, by the pressurized gas as it escapes from the cell. As used herein, the vent deflection zone 60 is defined as the space below the terminal cover, above diaphragm region 40, and between the diaphragm's first edge 64 and second edge 66. In FIG. 3, the vent deflection zone is identified with parallel diagonal lines. To ensure proper operation of the vent assembly, the vent deflection zone 60 should be devoid of any structural element that would impede movement of the vent flap and cause the flap to block the release of pressurized gas from the cell. For example, the existence of a support member 62, shown in FIG. 7, would inhibit proper operation of the vent flap. Support member 62 contacts the seal member's upstanding wall and the hub thereby compressing the perimeter wall against the container and the hub against the current collector. Consequently, in a preferred embodiment, the vent assembly of this invention includes a seal member, a current collector and a terminal cover that also functions as one of the cell's terminals and no other structural element in the vent deflection zone.

Inwardly disposed from second edge 66 are hub base 68, hub 70 and collector 30. Hub base 68 is thicker than diaphragm 40. Hub 70 abuts hub base 68 at a right angle. Hub 70 defines central opening 30 in seal member 28.

Seal member 28 is typically made as a single component by injection molding a polymeric material into a cavity and then allowing the part to solidify. Materials from which the seal member may be made include: nylon 6, 6; polypropylene; and impact modified polystyrene as described in U.S. Pat. No. 6,306,537.

An optional component of the vent assembly shown in FIGS. 3 and 6 is compression bushing 46. The exterior circumferential surface 72 of the compression bushing is made to align with vent 44. In vent assemblies that do not include a compression bushing, the vent is made to align with the outside diameter of hub 70.

Terminal cover 32 is a generally cup-shaped component made of nickel-plated steel. The perimeter 36 of cover 32 is formed by rolling back the edge of the cover upon itself to create a double thickness of material that is approximately perpendicular to the central portion 74 of cover 32. Between the covered central portion and its perimeter, the cover is contoured through a series of bends. The cover's central region 74 is recessed relative to the cover's rolled back edge 36. When cover 32 is inserted into the seal member's cover reception cavity 76 and the vent assembly is crimped into the open end of container 10, the cover acts like a spring that compresses the seal member's upstanding wall 34 against the interior surface of container 10. By contouring the cover to possess a spring like characteristic, the vent assembly does not need to include a separate component to force the seal member's perimeter wall against the container.

First electrode 12 is a mixture of manganese dioxide, graphite and an aqueous solution containing potassium hydroxide. The electrode is formed by disposing a quantity of the mixture into the open ended container and then using a ram to mold the mixture into a solid tubular shape that defines a cavity which is concentric with the sidewall of the container. Alternatively, the cathode may be formed by preforming a plurality of rings from the mixture comprising manganese dioxide and then inserting the rings into the container to form the tubularly shaped first electrode.

Second electrode 18 is a homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from Noveon, Inc., Cleveland, Ohio, USA. Carboxymethylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like.

The second electrode may be manufactured by combining the ingredients described above into a ribbon blender or drum mixer and then working the mixture into a wet slurry.

Electrolyte suitable for use in a cell of this invention is a thirty-seven percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode. The method used to incorporate electrolyte into the cell is not critical provided the electrolyte is in contact with the first electrode 12, second electrode 18 and separator 14.

During the cell assembly process, a quantity of an aqueous potassium hydroxide solution is incorporated into the cell. The solution serves as the cell's electrolyte. The electrolyte may be incorporated into the cell by allowing the gelling agent in the second electrode to absorb the electrolyte during the electrode manufacturing process which occurs prior to inserting the second electrode into the coiled separator. In addition, a quantity of electrolyte may be dispensed into the partially completed cell any time after the first electrode has been inserted into the container and prior to closing the cell.

Separator 14 may be made from nonwoven fibers. One of the separator's functions is to provide a barrier at the interface of the first and second electrodes. The barrier must be electrically insulating and ionically permeable.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

What is claimed is:

1. An electrochemical cell, comprising:
   (a) an open ended container, said container comprising a first electrode in contact with said container, a separator in contact with said first electrode, a second electrode in contact with said separator and electrolyte in contact with said first and second electrodes and said separator; and
   (b) a vent assembly, having a longitudinal axis, concentrically aligned with and secured to the open end of said container, said vent assembly comprising:
      i) an electrically conductive cup shaped terminal cover having a recessed central region and a peripheral edge;
      ii) a disc shaped rupturable seal member made of a polymeric material, said seal member comprising an upstanding perimeter wall compressed between said container and said cover's edge, a terminal cover reception channel located adjacent the upstanding perimeter wall, said edge of the cover disposed within said cover reception channel, and a thin rupturable diaphragm region having a first edge and a second edge, said diaphragm region located between the seal member's upstanding perimeter wall and a centrally located hub which defines an opening through said seal member, said seal member comprising a hinge located adjacent the first edge of the thin diaphragm region and a vent flap located adjacent the second edge of the thin diaphragm region, said hinge having an elevation, relative to the longitudinal axis of the vent assembly, that is closer to an elevation of a bottom surface of the thin diaphragm region at the vent flap than to an elevation of an inner surface of the cover's central region to prevent the vent flap from contacting the cover when pressurized gas in the cell escapes through the vent assembly;
      iii) a vent deflection zone, said zone defined as the space below the cover, above the diaphragm region and between the diaphragm's first edge and second edge, said zone devoid of any structural element, wherein in response to an undesirable increase in the cell's internal pressure, said seal ruptures along at least a portion of said thin diaphragm region's second edge thereby creating an orifice through which pressurized gas in the cell can escape; and
      iv) an electrically conductive current collector that contacts said hub, extends through the opening in said seal member and contacts said second electrode.

2. The electrochemical cell of claim 1 wherein said second edge of said thin diaphragm region comprises a grooved section and a nongrooved section, said grooved section defining the location of said vent and said nongrooved section defining an anchor which secures said diaphragm region to said hub.

3. The electrochemical cell of claim 2, wherein said groove is arc shaped and concentrically aligned with the central opening in said seal member.

4. The electrochemical cell of claim 2, wherein said nongrooved section forms at least a 30° arc.

5. The electrochemical cell of claim 2, wherein said nongrooved section forms approximately a 100° arc.

6. The electrochemical cell of claim 2, wherein said non-grooved section forms less than a 180° arc.

7. The electrochemical cell of claim 2, wherein said grooved section forms an arc greater than 180°.

8. The electrochemical cell of claim 2, wherein said grooved section forms an arc greater than 220°.

9. The electrochemical cell of claim 2, wherein said grooved section forms an arc greater than 250°.

10. The electrochemical cell of claim 1, wherein said hinge's elevation is between the elevation of the bottom surface of the thin diaphragm region at the vent and the elevation of the inner surface of the cover's central region.

11. The electrochemical cell of claim 1, wherein said hinge is arc shaped and concentrically aligned with the central opening in said seal member.

12. The electrochemical cell of claim 1, wherein said seal member comprises a buttress wall abutting said diaphragm region and said cover when said cell is pressurized, said buttress wall positioned to resist the compressive force exerted on said diaphragm by an increase in the cell's internal pressure.

13. The electrochemical cell of claim 1, wherein said polymeric material is selected from the group consisting of nylon, polypropylene and impact modified polystyrenes.

14. The electrochemical cell of claim 1, wherein a structural element contacts said seal member's hub.

15. The electrochemical cell of claim 1, wherein a structural element compresses said hub against said current collector.

16. The electrochemical cell of claim 1, wherein the peripheral edge is approximately perpendicular to the central region.

17. The electrochemical cell of claim 1, wherein the electrically conductive cup shaped terminal cover comprises a rolled back edge that is approximately perpendicular to the central region, wherein the rolled back edge defines the peripheral edge.

18. The electrochemical cell of claim 17, wherein the upstanding perimeter wall of the seal member is compressed between the container and the cover's rolled back edge, and the rolled back edge of the cover is disposed within the cover reception channel.

19. The electrochemical cell of claim 1, wherein the flap rotates about the hinge and through the vent deflection zone without contacting any object.

20. The electrochemical cell of claim 1, wherein the electrically conductive cup shaped cover is a first structural element, the disc shaped rupturable seal member is a second structural element, and the electrically conductive current collector is a third structural element, wherein the zone between the cover and the flap is devoid of any other structural element, such that the flap rotates about the hinge and through the vent deflection zone toward the cover without contacting any object.

21. The electrochemical cell of claim 12, wherein said buttress wall is an upstanding wall projecting above upper surfaces of both the diaphragm region and the cover reception channel.

22. The electrochemical cell of claim 21, wherein the electrically conductive cup shaped terminal cover comprises a rolled back edge that is approximately perpendicular to the central region, with rolled back edge defines the peripheral edge of the cover, and the buttress wall is disposed adjacent an inner surface of the peripheral edge of the cover.

23. The electrochemical cell of claim 19, wherein said seal member comprises a buttress wall abutting said diaphragm region and said cover when said cell is pressurized, said buttress wall positioned to resist the compressive force exerted on said diaphragm by an increase in the cell's internal pressure.

24. The electrochemical cell of claim 23, wherein said buttress wall is an upstanding wall projecting above upper surfaces of both the diaphragm region and the cover reception channel.

25. The electrochemical cell of claim 24, wherein the electrically conductive cup shaped terminal cover comprises a rolled back edge that is approximately perpendicular to the central region, with rolled back edge defines the peripheral edge of the cover, and the buttress wall is disposed adjacent an inner surface of the peripheral edge of the cover.

* * * * *